United States Patent [19]

Hashimoto

[11] Patent Number: 5,010,422

[45] Date of Patent: Apr. 23, 1991

[54] DRIVING SYSTEM FOR ENDLESS VIDEO TAPE BY ONE-TOUCH TIMER

[75] Inventor: Kazuo Hashimoto, Tokyo, Japan

[73] Assignee: Hashimoto Corporation, Tokyo, Japan

[21] Appl. No.: 483,034

[22] Filed: Feb. 21, 1990

[30] Foreign Application Priority Data

Feb. 24, 1989 [JP] Japan .................................. 1-44255

[51] Int. Cl.$^5$ ..................... G11B 15/18; G11B 19/02
[52] U.S. Cl. ........................................ 360/69; 360/71
[58] Field of Search .............................. 360/69–71, 360/137

[56] References Cited

U.S. PATENT DOCUMENTS

| | | | |
|---|---|---|---|
| 4,166,283 | 8/1979 | Van Slageren | 360/71 |
| 4,811,122 | 3/1989 | Kido et al. | 360/69 X |
| 4,914,534 | 4/1990 | Chito | 360/69 |

FOREIGN PATENT DOCUMENTS

WO87/01856 3/1987 World Int. Prop. O. .

*Primary Examiner*—John H. Wolff
*Attorney, Agent, or Firm*—Lowe, Price, LeBlanc, Becker & Shur

[57] ABSTRACT

A driving system for endless video tape controlled by a one-touch timer wherein when an endless video tape is loaded into a video tape recorder (VTR), a switch is changed over to an endless side to prevent tape operation beyond a predetermined period of time determines by a one-touch timer which is preset. If the VTR is being driven, for example, in a recording mode and the operation mode is changed to any other mode, for example, to the playback mode, the timer set time is automatically extended for the predetermined period of time. An indicator for distinguishing between different operation modes is provided, and an alarm is visually or audibly applied by the indicator for a short period of time, such as one minute, before the timer stops.

10 Claims, 2 Drawing Sheets

DRIVING SYSTEM FOR ENDLESS VIDEO TAPE BY ONE-TOUCH TIMER

BACKGROUND OF THE INVENTION

This invention relates to a driving system for an endless type video tape.

An endless type video tape is disclosed in Japanese Patent Publication No. 39515/1987 (Japanese Patent Application No. 86025/1981) filed by the same applicant. This endless video tape can be now used in any tape deck which can use video tape cassettes having tape ends in both VHS and beta types.

Video tapes now available include a tape end type and an endless type. Whereas it takes two or three hours to play a video tape with tape ends from the beginning to the end, it takes only about 20 seconds for one cycle in the case of the endless type video tape. Therefore, there is a problem that if one uses an endless video tape either in a recording mode or a playback mode, it is not unusual for one to forget to stop the tape deck; this accelerates wear of the tape.

SUMMARY OF THE INVENTION

It is an object of the present invention to provide a driving system for an endless video tape controlled by a one-touch timer when the cassette of the endless tape is loaded into a video tape recorder (VTR), a switch is changed over to an endless side to prevent tape operation beyond a predetermined period of time by the timer which is preset, and an alarm is applied for a short period of time, such as one minute, before the timer stops. Further, if the operation mode is changed to any other different mode during VTR operation, the timer set time is automatically extended for the predetermined period of time.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Hereinafter, construction and function of the present invention will be described with reference to an embodiment thereof.

Figure 1:
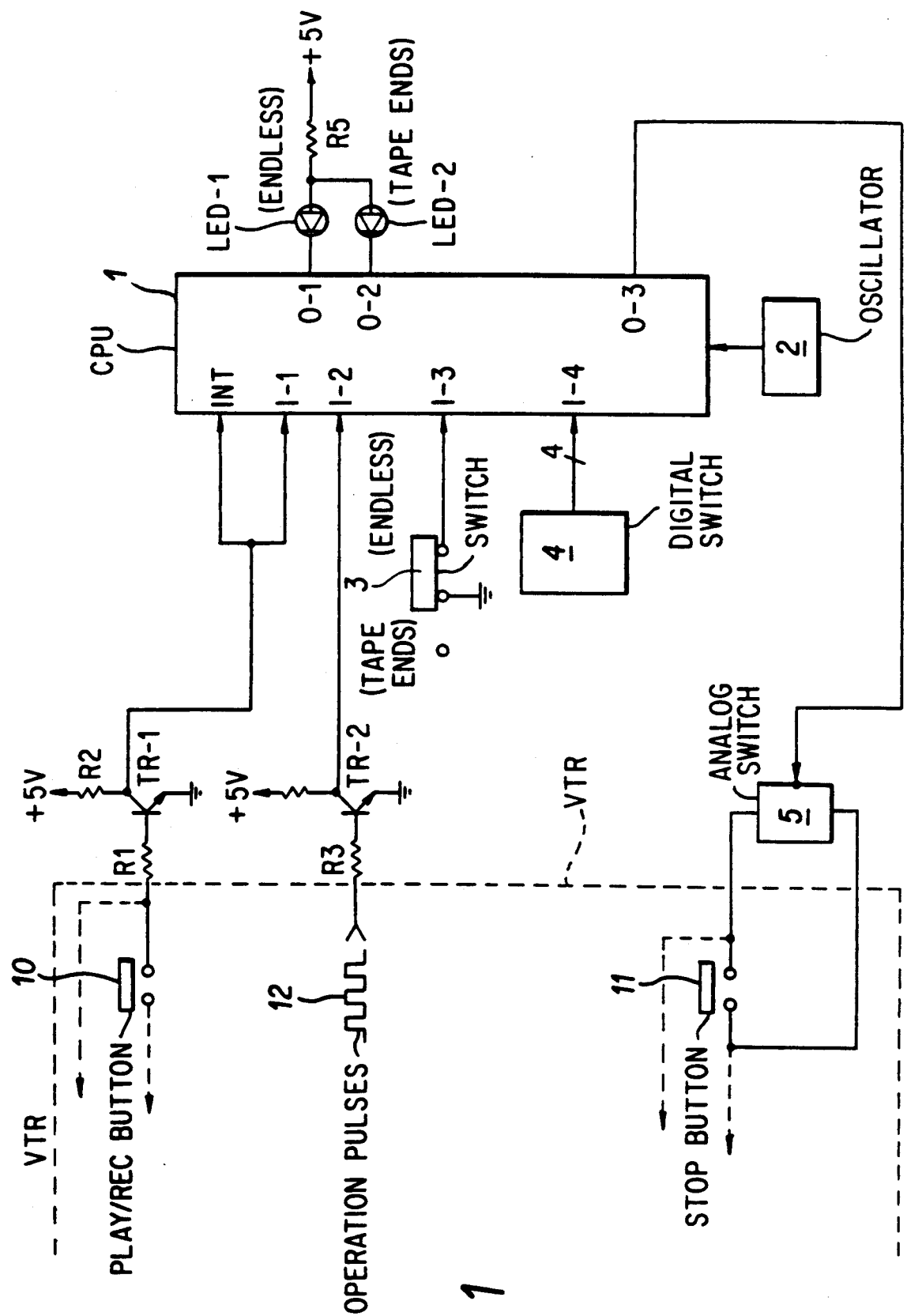
FIG. 1 is a circuit diagram showing an embodiment of the present invention.

In FIG. 1, reference numeral 1 represents a one-chip microprocessor (CPU) with a built-in program. A terminal $\overline{INT}$ is an interrupt terminal, I-1 through I-4 are input ports and 0-1 through 0-3 are output ports. Reference numeral 2 represents an oscillator for oscillating reference clocks and 3 is a switch for switching according to the type of tape used in a later-discussed VTR, that is, whether an endless tape or a tape with tape ends is used. Reference numeral 4 represents a digital switch for setting a later-discussed timer which is set corresponding to one cycle period of the endless tape, and reference numeral 5 represents an analog switch which is turned ON when the operating time reaches the set time of the timer. Symbols TR-1 and TR-2 represent transistors and symbols LED-1 and LED-2 represent light emitting diodes.

Symbol VTR represents a video tape recorder and only the portions which relate to the present invention are shown. Reference numeral 10 represents a PLAY(-playback)/REC(recording) button and symbol 11 represents a STOP(stop) button. Reference numeral 12 represents pulses which are generated during travel of the tape and is used for detecting any accident of the tape.

Figure 2:
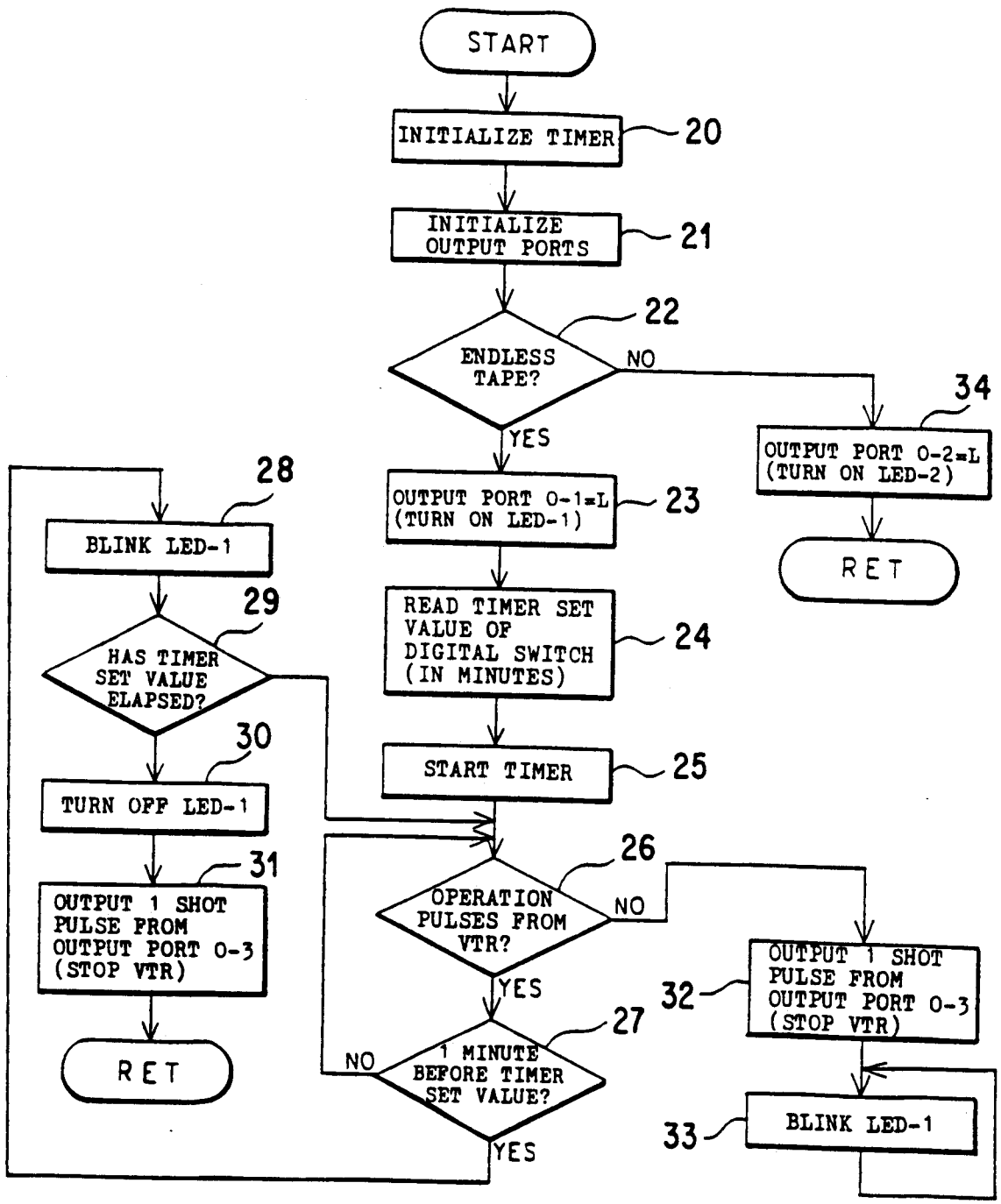
FIG. 2 is a flow chart showing the operation of the present invention.

To use the present system, the endless tape or the tape with tape ends is first loaded in the VTR. First, assume that a 20 sec/cycle endless tape is loaded. The switch 3 is set to its "endless" side and the digital switch for setting the timer is set to "A" ("10" in decimal notation) corresponding to "10 minutes", for example. It is also possible to provide a protuberance, for example, on the case of the endless tape so that the switch 3 can be switched automatically when the endless tape is loaded. Next, when the recording or playback button 10 is pushed, an internal voltage is applied to the base of the transistor TR-1 through a resistor R1 and this transistor is turned ON. Accordingly, since the interrupt terminal $\overline{INT}$ of the CPU 1 changes from the H level to the L level, an interrupt occurs and the program stored in the CPU 1 jumps to the routine shown in FIG. 2.

First of all, the timer is initialized at step 20. The CPU 1 incorporates therein a timer which operates by a divided frequency of the reference clock of the oscillator 2 and can set the operation time by the program. This is an ordinary function which is incorporated in one-chip microprocessors. In this embodiment the operation time is programmed so that the timer is set by a unit of one minute and the set time is read.

At the next step 21, the output ports 0-1 and 0-2 are initialized to the H level and, 0-3 is initialized to the L level. If the light emitting diodes LED-1, LED-2 are ON, they are turned OFF and the analog switch 5 is turned OFF. At step 22, whether the switch 3 is switched to the endless tape side or to the tape with tape ends side through the input port I-3 is tested. When it is switched to the endless tape side, the input port I-2 is at the L level as is obvious from the drawing. And in this case, the flow shifts to step 23, where the light emitting diode LED-1 is turned ON. At the next step 24, the set value of the digital switch 4, such as "A" (10 minutes) described above, is read through the input port I-4. Here, the aforementioned timer is started (step 25). During the operation of the timer, operation pulses from the VTR, such as pulses from a tape counter (not shown), are tested through the transistor TR-2 and the input port I-2 at step 26. If any accident related with the tape occurs, the pulses described above disappear. Then, the flow shifts to step 32, where a one-shot pulse is outputted from the output port 0-3, the analog switch 5 is turned ON in the interim, the VTR operation is stopped and the light emitting diode LED-1 is blinked (step 33).

If the operation pulses from the VTR are produced normally, on the other hand, the flow shifts from step 26 to step 27. A loop of step 27 and step 26 is formed for the period until a time of one minute before the set value of the timer, that is, for nine minutes in the example described above. When the time reaches one minute before the set time, the step 27 becomes "YES", thereby forming a loop comprising step 26, step 27, step 28, step 29 and back to step 26 until the timer set value, i.e., 10 minutes, elapses. Therefore, the light emitting diode LED is blinked for one minute at step 28 in this loop so as to issue an alarm that the set time is soon over. After this 10 minutes time elapses, step 29 becomes "YES", the light emitting diode LED is turned OFF (step 30) and VTR operation is stopped (step 31).

The routine described above operates due to an interrupt. Therefore, if the aforementioned PLAY (REC) button 10 is pushed before the 10 minutes time elapses, the flow from step 20 runs so that the operation can be extended further by 10 minutes without stopping the endless tape even though the operation mode is changed.

When the tape with tape ends is used, on the other hand, the aforementioned switch 3 is set to the "tape ends" side. When the routine described above operates under this state, the flow shifts from step 22 to step 34 and the light emitting diode LED-2 is turned ON continuously.

Incidentally, a time of one minute before the timer set value is detected at step 27 described above. However, this "one minute before" can be changed arbitrarily by use of a separate digital switch corresponding to the digital switch 4 described above in order to make the use more convenient.

As described above, the present invention provides means for preventing wear of the tape in the case that the cassette of the endless video tape is loaded into and used in a commercially available video tape driving apparatus and its practical usefulness is great.

According to the present invention, as described above, the specification is limited to the use of an endless tape. However, needless to say, the spirit of the present invention can be applied not only to an endless tape, but also to a normal tape with tape ends for the purpose of preventing waste by forgetting to stop the tape or to switch off the unit.

I claim:

1. A driving system for an endless video tape comprising:
    a video tape recorder (VTR);
    a one-touch timer which is preset by a predetermined one-touch operation; and
    control means for driving the VTR in response to the one-touch timer, including means for automatically stopping the VTR if a set time of a predetermined period of said one-touch timer elapses during a driving operation of the VTR, and means responsive to a change in a VTR operation mode to any other mode during said driving, for automatically extending the set time of said one-touch timer for the predetermined period of time and stopping the VTR after said predetermined period of time elapses.

2. A driving system for an endless video tape according to claim 1, comprising indication means, responsive to the different operation modes for visually or audibly producing an alarm before the one-touch timer stops.

3. In a video tape recorder (VTR) operative in recording and playback modes, a driving system for an endless video tape, comprising:
    a one-touch timer for timing a predetermined period in response to operation of a single button;
    means for automatically stopping said VTR during the recording or playback mode upon expiration of said predetermined period; and
    means for automatically extending the timing period of said timer for a unit of time equal to said predetermined period in response to a change of the mode of operation of said VTR from recording to playback or from playback to recording, and thereafter for stopping said VTR when the extended period of time elapses.

4. The driving system of claim 3, further comprising means for producing an alarm indication upon expiration of a fixed period of time prior to stopping of said VTR.

5. In a video tape recorder (VTR) operative in recording and playback modes, a driving system for an endless video tape, comprising:
    mode selection means for selecting one of the modes of operation of the VTR, wherein the VTR enters the selected mode of operation in response to actuation of said mode selection means;
    means to indicate that a tape being used by the VTR is an endless tape; and
    safety timer means responsive to the indication that said tape is endless for timing a predetermined period following said actuation of said selection means, wherein said safety timer means stops operation of said VTR when said predetermined period elapses.

6. A driving system as in claim 5, wherein said timer means comprises a one-touch timer.

7. A driving system as in claim 6, further comprising means to reset said one-touch timer in response to changes in mode of operation of said video tape recorder input by user actuation of said mode selection means during operation.

8. A driving system as in claim 5, further comprising means responsive to an initial operation of said mode selection means for triggering said timer means to initiate its timing operation.

9. A driving system as in claim 5, further comprising means to reset said timer means in response to changes in mode of operation of said video tape recorder input by user actuation of said mode selection means during operation.

10. A control system for a video tape recorder in accord with claim 5, further comprising an indicator for alerting the user prior to elapse of a predetermined time set in said timer means.

* * * * *